United States Patent
Kondo et al.

[11] Patent Number: 5,928,754
[45] Date of Patent: Jul. 27, 1999

[54] FLOOR MATERIAL

[75] Inventors: Michio Kondo; Takashi Butsuda; Xue Fang Song, all of Osaka, Japan

[73] Assignee: Takiron Co., Ltd., Osaka, Japan

[21] Appl. No.: 08/676,394

[22] PCT Filed: Jun. 27, 1995

[86] PCT No.: PCT/JP95/01282

§ 371 Date: Jul. 22, 1996

§ 102(e) Date: Jul. 22, 1996

[87] PCT Pub. No.: WO96/16803

PCT Pub. Date: Jun. 6, 1996

[30] Foreign Application Priority Data

Nov. 30, 1994 [JP] Japan .................................. 6-323613
Apr. 30, 1995 [JP] Japan .................................. 7-131028

[51] Int. Cl.$^6$ ...................................................... B32B 9/00
[52] U.S. Cl. .......................... 428/95; 428/81; 428/143; 428/159; 428/192; 428/212; 428/317.1; 428/327; 428/337; 428/339; 428/402; 428/908.8; 524/914; 156/62.2; 156/71; 156/72
[58] Field of Search .................................. 428/143, 327, 428/402, 81, 192, 212, 337, 339, 159, 95, 313.5, 147, 48, 317.1, 904.4, 908.8, 172; 156/324, 327, 334, 72, 62.2, 71, 79, 219; 524/914, 563, 524

[56] References Cited

U.S. PATENT DOCUMENTS 3,975,562  8/1976  Madebach et al. .................. 428/95
4,397,906  8/1983  Nakagawa et al. .................. 428/195
4,614,680  9/1986  Fry et al. ............................. 428/158
5,244,942  9/1993  Hover et al. ........................ 523/171
5,276,082  1/1994  Forry et al. ......................... 524/504

FOREIGN PATENT DOCUMENTS 63-99380   4/1988   Japan .................. D06N 7/04
2-301434  12/1990   Japan .................. B32B 27/32
2301434   12/1990   Japan .................. B32B 27/32

Primary Examiner—Deborah Jones
Assistant Examiner—Abraham Bahta
Attorney, Agent, or Firm—Sughrue, Mion, Zinn, Macpeak & Seas, PLLC

[57] ABSTRACT

A floor material which generates no harmful gas such as hydrogen chloride at the time of a fire, is suitable for dry maintenance with a high speed buffing machine and has excellent resistances against flaws, stains, abrasion and the like, which is also a floor material having markedly excellent adhesiveness to the floor ground. This invention is characterized in that a wax is contained in an amount of from 1 to 10% by weight in at least the surface layer of the floor material in which an olefinic resin is used as the base material and an inorganic filler is blended therein. Preferably, a back side layer of an ethylene-vinyl acetate copolymer or a mixed resin of said copolymer and other olefinic resin is used as its base material having an inorganic filler is blended therein is laminated on the under side of the surface layer, and 1 to 10% by weight of rosin is included in said back side layer. The inventive floor material can be used broadly as the flooring in, for example, constructions such as buildings, apartment houses and the like and transportation means such as cars, ships, aircraft and the like.

12 Claims, 1 Drawing Sheet

FLOOR MATERIAL

TECHNICAL FIELD

This invention relates to a floor material made of an olefinic resin, more particularly to a floor material of which dry maintenance performance is improved by including wax in its surface layer.

BACKGROUND ART

Floor materials made of vinyl chloride resins have been widely used in the flooring of buildings and apartment houses. However, when a fire breaks out, such floor materials made of vinyl chloride resins generate harmful smoke containing hydrogen chloride which exerts a bad influence upon the human body and prevents persons from fleeing for safety and fighting the fire. Also, when a dry maintenance method in which a floor is polished with a high speed buffing machine is used as a means for effecting daily maintenance of a floor which is covered with a floor material made of a vinyl chloride resin, its inappropriate use causes problems of reducing surface gloss of the floor material, accelerating abrasion of the floor surface, changing its color and forming flaws and blisters.

Accordingly, studies have recently been carried out on floor materials in which halogen-free olefinic resins are used as the base material and inorganic fillers are included therein. In particular, a floor material which is made of, as the base material, polypropylene having relatively good abrasion resistance, heat resistance and the like has been put into practical use. This polypropylene floor material is safe because of no generation of harmful gas such as hydrogen chloride and the like when a fire breaks out. In addition, it is suitable for dry maintenance because its surface gloss is slightly improved when polished with a buffing machine, the abrasion low, and changes in color and formation of blisters do not occur.

Although surface gloss of the polypropylene floor material is slightly improved when polished with a buffing machine as described above, the gloss-improving degree is not remarkable and its flaw resistance and stain resistance are not so good, thus leaving much room for improving these points.

Also, the polypropylene floor material is poor in adhesiveness, and thus it has a serious problem in that it is apt to peel off even when applied to a floor ground via an adhesive agent. Such a problem can be solved by treating the back side of the floor material with a commercially available primer for polypropylene. However, since said primer contains solvents, treatment of the back side of the floor material with the primer at the time of the production of the material or its flooring application poses a problem relating to fire or a problem that working environment is deteriorated. In particular, when the primer treatment is carried out at the time of flooring application on the spot, there is a fear that the reliability will be reduced in terms of adhesiveness. In consequence, such a primer treatment should not be employed and it therefore is desirable to fundamentally improve adhesiveness of the floor material.

The present invention was accomplished taking the aforementioned problems into consideration, with a principal object of providing an olefinic resin floor material having excellent dry maintenance performance.

Another object of the present invention is to provide an olefinic resin floor material having not only excellent dry maintenance performance but also excellent adhesiveness.

DISCLOSURE OF THE INVENTION

The inventors of the present invention have conducted extensive studies and, as the result, found a fact that dry maintenance performance of an olefinic resin floor material is considerably improved when a wax is contained in its surface layer, as well as another fact that adhesiveness of the floor material is markedly improved when a specific olefinic resin is selected and used as the resin of the back side layer and rosin is included therein at the same time, hence resulting in the accomplishment of the present invention.

Accordingly, the floor material of the present invention is characterized in that a wax is contained in an amount of from 1 to 10% by weight in at least the surface layer of a floor material in which an olefinic resin is used as the base material and an inorganic filler is mixed therein, and the wax content in the surface layer is set preferably within the range of from 1 to 7% by weight. Examples of the wax include a low molecular weight polyethylene, an alicyclic saturated hydrocarbon resin, a petroleum resin and the like, which may be used alone or as a mixture of two or more.

In a preferred embodiment, the present invention relates to a floor material comprising at least two layers, wherein one of the layers is a surface layer, wherein the layers comprise an olefinic resin as the base material and an inorganic filler blended therein, wherein a wax in an amount of from 1 to 10% by weight is contained in the surface layer.

As a more preferred floor material of the present invention, a back side layer in which an ethylene-vinyl acetate copolymer or a mixed resin of said copolymer and other olefinic resin as a base material in which an inorganic filler blended therein is laminated on the under side of the above-described surface layer and 1 to 10% by weight of rosin is included in said back side layer, wherein the ethylene-vinyl acetate copolymer to be used contains 35 to 75% by weight of vinyl acetate and the inorganic filler content of the back side layer is set within the range of from 50 to 85% by weight.

Since the floor material of the present invention uses an olefinic resin as its base material, it is suitable for dry maintenance in comparison with the conventional vinyl chloride floor materials and it does not cause abrasion, changes in color and formation of blisters on its surface when it is polished with a high speed buffing machine. Since 1 to 10% by weight of a wax is further contained in the surface layer of the floor material and the wax is exposed on the surface in a dispersed state, the floor material has a polished surface gloss. Even when surface gloss of such a wax-containing surface layer is reduced due to walking and the like, the surface is slightly rubbed down and a new polished surface with dispersed wax is exposed by polishing with a buffing machine, so that the polished surface gloss can be restored whenever the polishing is carried out. Accordingly, the floor material of the present invention shows excellent dry maintenance performance. In addition, since lubricity is improved by containing wax in the surface layer, flaw resistance, stain resistance, abrasion resistance and the like are also improved.

It is necessary that the wax content of the surface layer be set within the range of from 1 to 10% by weight, and preferably set within the range of from 1 to 7% by weight. The content if smaller than 1% by weight would bear no significant improvement in surface gloss as well as in flaw resistance, stain resistance, abrasion resistance and the like. On the other hand, the content if larger than 10% by weight would not only reduce stain resistance but also cause problems of reduced mechanical properties, heat resistance and weather resistance.

According to the more preferred floor material of the present invention, the ethylene-vinyl acetate copolymer of the back side layer is an olefinic resin which has excellent adhesiveness, and the rosin contained in the back side layer has good compatibility with the ethylene-vinyl acetate copolymer and shows good adhesion to inorganic fillers such as calcium carbonate, aluminum hydroxide and the like, so that it exerts a reinforcing action to inhibit embrittlement of the back side layer by firmly keeping in the back side layer inorganic fillers which have high adhesiveness with adhesive agents. Since adhesiveness between the back side layer and adhesive agents is improved by the addition of rosin because of such reasons, the preferred floor material of the present invention can be applied firmly to floor grounds without carrying out primer treatment but simply using various commercially available adhesive agents for floor material (adhesive agents based on rubber, vinyl acetate, urethane, epoxy, acryl and the like). Particularly, use of an ethylene-vinyl acetate copolymer containing 35 to 75% by weight of vinyl acetate is used in the floor material further improves the adhesive strength, because the back side layer becomes rich in flexibility and is high in the polar vinyl acetate content.

The inorganic filler content of the back side layer has a correlation with the adhesive strength, and there is a tendency that the adhesive strength increases as the inorganic filler content increases as long as the back side layer does not become brittle. From this point of view, the preferred floor material in which the inorganic filler content of the back side layer is set to 50 to 85% by weight shows excellent adhesive strength because of the high inorganic filler content and due to the reinforcing effect of rosin to sufficiently inhibit embrittlement of the back side layer. However, the inorganic filler content if larger than 85% by weight would cause reduction of the adhesive strength, because it is difficult to avoid embrittlement of the back side layer even in the presence of rosin.

The rosin content of the back side layer should be set to 1 to 10% by weight. When the rosin content is less than 1% by weight, it is difficult to inhibit embrittlement of the back side layer sufficiently and substantial improvement of the adhesive strength is difficult. On the other hand, the content if larger than 10% by weight would not improve the adhesive strength over a certain level but rather exert bad influences upon other physical properties, such as reduced tensile force resistance, unstable hue and the like.

BEST MODE OF CARRYING OUT THE INVENTION

Figure 1:
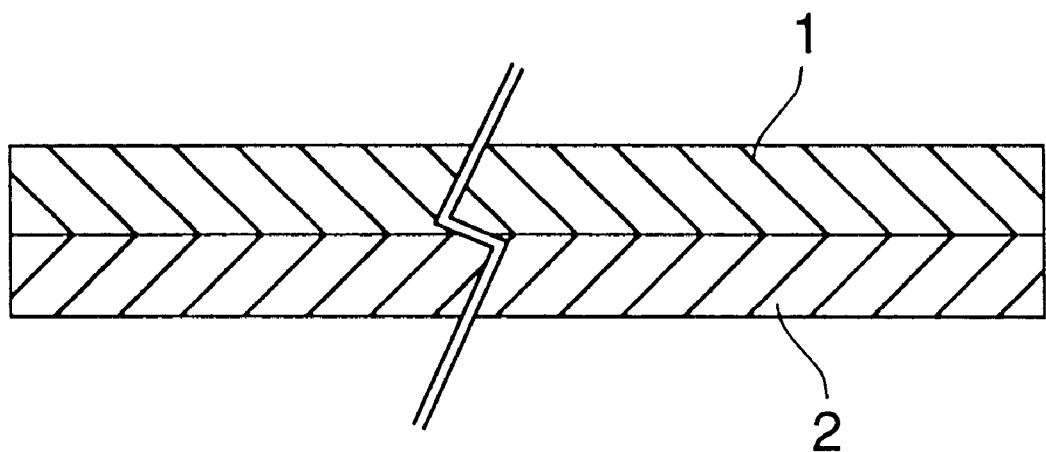
FIG. 1 is a sectional view showing an example of the floor material of the present invention.

The floor material of the Example shown in FIG. 1 is a tile-like floor material (floor tile) of a two-layer structure in which a back side layer 2 is laminated on the under side of a surface layer 1.

The surface layer 1 of the floor material is a layer in which an olefinic resin is uniformly blended with an inorganic filler and a wax. Though not particularly limited, it may have a thickness of approximately from 1.0 to 5.0 mm.

With regard to the olefinic resin of the surface layer 1, polypropylene and an ethylene-vinyl acetate copolymer may be used suitably, and it is preferable to use them as a mixture of a weight ratio of 7:3 to 4:6. The mixing ratio of polypropylene if larger than the above range would make the surface layer 1 hard and brittle, and if smaller than the above range would soften the surface layer 1, thereby reducing depression resistance and abrasion resistance.

Particularly, a mixture containing polypropylene having a melt index of 1 to 10 and an ethylene-vinyl acetate copolymer containing 35% by weight or less of vinyl acetate, mixed at the aforementioned mixing ratio, is extremely preferable as the resin of the surface layer 1. Since the former polypropylene has well-balanced properties between hardness and impact strength and elongation and the like, and the latter ethylene-vinyl acetate copolymer has low crystallinity and good workability and dimensional stability, use of such a mixed resin renders possible formation of the surface layer 1 having well-fitted physical properties for floor materials.

As a matter of course, various other olefinic resins such as polyethylene and the like may also be used as the resin of the surface layer 1.

Kinds of the inorganic filler to be contained in the surface layer 1 are not particularly limited, but powder of calcium carbonate or aluminum hydroxide is suitable, and fine powder having an average particle size of 10 $\mu$m or less and having good kneading property may be used preferably. Since aluminum hydroxide powder is an excellent flame retarder which discharges water by thermal decomposition, a floor material that should have strict flame resistance, such as a floor material for vehicle use, can be obtained when the aluminium hydroxide powder is mixed with calcium carbonate powder and contained in the surface layer 1.

The wax as a characteristic component of the surface layer 1 is included in the surface layer 1 with the aim of providing excellent dry maintenance performance and improving surface gloss significantly. Examples of the wax include a low molecular weight polyethylene, an alicyclic saturated hydrocarbon, a petroleum resin and the like which may be used alone or as a mixture of two or more.

When a wax is contained in the surface layer 1 in this way, the wax is exposed on the surface in a dispersed state so that a polished surface gloss is obtained. Also, even when surface gloss of the surface layer 1 is reduced due to walking and the like, the surface is slightly rubbed down and a new polished surface with dispersed wax is exposed when polished with a buffing machine, so that the polished surface gloss can be restored whenever the polishing is carried out. In addition, since lubricity is improved when the surface layer 1 contains a wax, flaw resistance, stain resistance, abrasion resistance and the like are also improved.

It is necessary that the wax content of the surface layer 1 be set within the range of from 1 to 10% by weight. The wax content if smaller than 1% by weight would bear no significant improvement of surface gloss even when the surface layer 1 was polished with a buffing machine, and improvement in flaw resistance, stain resistance, abrasion resistance and the like would not be obtained, hence entailing a difficulty in achieving the object of the present invention. On the other hand, the content if larger than 10% by weight would cause not only reduced stain resistance but also reduced mechanical properties, heat resistance and weather resistance, thus also causing a difficulty in obtaining a satisfactory floor material. More preferred wax content is within the range of from 1 to 7% by weight.

Also, it is desirable to set the olefinic resin content of the surface layer 1 to 25 to 40% by weight and the inorganic filler content to 57 to 72% by weight. The olefinic resin content if smaller than 25% by weight and the inorganic filler content if larger than 72% by weight would cause embrittlement of the surface layer 1 which would cause problems such as cracking, in addition to the reduction of abrasion resistance. On the other hand, the olefinic resin content if larger than 40% by weight and the inorganic filler content if smaller than 57% by weight would reduce flame resistance of the surface layer 1 which therefore would catch fire easily.

As occasion demands, the surface layer 1 may contain various additives such as pigments, a peroxide-based cross-linking agents, lubricating agents such as a bisamide or the like, phenol-based antioxidants, benzophenone-based light stabilizing agents and the like. These additives may be used in an amount of up to 1% by weight at the most, generally 0.5% by weight or less.

The back side layer of the floor material is a layer in which an ethylene-vinyl acetate copolymer or a mixed resin consisting of said copolymer and other olefinic resin is uniformly blended with an inorganic filler and rosin. Though not particularly limited, it may have a thickness of approximately from 0.1 to 5 mm.

With regard to the ethylene-vinyl acetate copolymer of the back side layer 2, a copolymer which contains 35 to 75% by weight of vinyl acetate may be used most preferably. The back side layer 2 containing such a copolymer has flexibility and is rich in compatibility with adhesive agents because of its high content of polar vinyl acetate and appropriate copolymer molecule length, so that adhesive strength similar to or higher than those of polyvinyl chloride and the like can be obtained. A copolymer containing less than 35% by weight of vinyl acetate is not preferable because of insufficient flexibility and adhesiveness, and a copolymer containing more than 75% by weight of vinyl acetate is not preferable because of poor water resistance and alkali resistance. In this connection, when a copolymer which contains a large amount of vinyl acetate and therefore is poor in water resistance and alkali resistance is used, it is possible to control these properties by mixing an appropriate amount of polyvinyl alcohol or the like.

In the case that the resin of the back side layer 2 is a mixed resin of the ethylene-vinyl acetate copolymer and other olefinic resin, it is preferable to use a mixed resin in which the ethylene-vinyl acetate copolymer is mixed at a ratio of at least 30% by weight or more based on the total resin. When a mixed resin containing less than 30% by weight of the ethylene-vinyl acetate copolymer is used, the back side layer 2 becomes hard and brittle and its adhesiveness is reduced. Polypropylene, polyethylene or the like may be used preferably as the other olefinic resin to be mixed with the ethylene-vinyl acetate copolymer.

It is preferable to adjust the resin content of the back side layer 2 within the range of from 15 to 50% by weight. The resin content if smaller than 15% by weight would cause brittleness of the back side layer 2 and reduce its adhesive strength and if larger than 50% by weight would cause shrinkage of the back side layer 2 at the time of molding due to too much resin content, thus causing a possibility of generating warpage of the floor material.

The aforementioned inorganic filler of the surface layer 1 may be used as the inorganic filler to be contained in the back side layer 2, and calcium carbonate powder or aluminum hydroxide powder having an average particle size of 10 $\mu$m or less and having good kneading property may be used preferably.

It is desirable to adjust the inorganic filler content of the back side layer 2 within the range of from 50 to 85% by weight. The inorganic filler content has a correlation with the adhesive strength, showing a tendency to increase the adhesive strength of the back side layer 2 as the inorganic filler content increases as long as the back side layer 2 does not become brittle. The inorganic filler content if smaller than 50% by weight would bear no sufficient adhesive strength of the back side layer 2 and cause shrinkage of the back side layer 2 at the time of molding due to too much resin content, thus causing a possibility of generating warpage of the floor material. However, the inorganic filler content if too large would cause embrittlement of the back side layer 2 so that the adhesive strength would be reduced.

As a consequence, rosin is contained in the back side layer 2 as a characteristic component. Since the rosin has good compatibility with the ethylene-vinyl acetate copolymer and excellent adhesiveness with the inorganic filler, it acts as a reinforcing agent which inhibits embrittlement of the back side layer 2 by firmly keeping the inorganic filler in the back side layer. It is difficult to improve adhesive and mechanical strengths of the back side layer 2 sharply without using the rosin. When rosin is contained in the back side layer 2, mechanical strength of the back side layer 2 is improved due to its reinforcing action and embrittlement of the back side layer 2 can be inhibited even when the inorganic filler is contained in an amount of up to 85% by weight, hence rendering possible sharp increase in the adhesive strength.

The rosin content should be set to 1 to 10% by weight, because the rosin content of less than 1% by weight cannot inhibit embrittlement of the back side layer 2 sufficiently and the adhesive strength therefore be improved substantially. On the other hand, the content if larger than 10% by weight would not improve the adhesive strength over a certain level but rather exert problems upon other physical properties, such as reduced tensile force resistance, unstable hue and the like.

In this connection, the back side layer 2 may contain small amounts of various additives similar to the case of the surface layer 1.

The floor material of the aforementioned construction can be produced by, for example, the following method.

First, an olefinic resin, an inorganic filler, a wax and, as occasion demands, an additive agent are formulated at the aforementioned blending ratio (percentage content), and the mixture is subjected to an extrusion granulating machine to obtain powdery granules used for forming the surface layer. On the other hand, an ethylene-vinyl acetate copolymer or a mixed resin of said copolymer and other olefinic resin is blended with an inorganic filler, rosin and, as occasion demands, an additive agent at the aforementioned blending ratio (percentage content), and the mixture is subjected to sheeting using an extruder to obtain a sheet to be used as a back side layer. Thereafter, up side of this sheet is laminated with the powdery granules for forming surface layer which are subsequently subjected to gelation by heating and pressed with a pressure roller or the like to form an integrated surface layer, thereby producing a two-layer structure floor material.

Though the floor material shown in FIG. 1 is a two-layer structure floor material in which the surface layer 1 and the back side layer 2 are laminated into one body, it may also be possible to product a floor material having a structure of three or more layers by arranging one or more intermediate layers between the surface layer 1 and the back side layer 2. In that case, the intermediate layer may preferably be a layer in which an olefinic resin is blended with an inorganic filler and, as occasion demands, an additive agent (a layer which does not contain wax and rosin) and the back side layer 2 may preferably be a thin layer of approximately 0.1 to 0.5 mm for improving its adhesiveness. Alternatively, when the adhesiveness is not particularly important, a single-layer floor material is produced in which an olefinic resin is used as the base material and an inorganic filler is blended therewith, and a wax is contained in the entire floor material in an amount of from 1 to 10% by weight.

Next, the floor material of the present invention is described with reference to more illustrative Examples and Comparative Examples.

In this connection, the melt index described herein was measured in accordance with the procedure of JIS K 7210, particularly under the condition 14 (melting temperature, 230° C.; testing load, 2.16 kgf), in the case of polypropylene, or in accordance with the procedure of JIS K 6730, particularly under the condition 4 (melting temperature, 194° C.; testing load, 2.16 kgf), in the case of ethylene-vinyl acetate copolymer.

EXAMPLE 1

A mixture of 14% by weight of polypropylene (melt index: 10), 14% by weight of an ethylene-vinyl acetate copolymer (vinyl acetate content: 15% by weight; melt index: 7), 70% by weight of calcium carbonate powder (average particle size: 3 μm), 1.7% by weight of an alicyclic saturated hydrocarbon resin (Alcon P-140, manufactured by Arakawa Kagaku) as a wax and 0.3% by weight of a heat stabilizer and a light stabilizer was subjected to an extrusion granulating machine to obtain powdery granules (average particle size: 0.5 mm) for producing the surface layer.

On other hand, a mixture of 11% by weight of the just described polypropylene, 13.4% by weight of an ethylene-vinyl acetate copolymer (vinyl acetate content: 50% by weight; melt index, 20), 73.1% by weight of the just described calcium carbonate powder, 2.4% by weight of rosin and 0.1% by weight of an antioxidant, a light stabilizer and a pigment was subjected to sheeting using an extruder to obtain a sheet of 2 mm in thickness to be used as a back side layer.

The powdery granules for producing surface layer were laminated on the thus obtained sheet and heated for 1 to 10 minutes at 130 to 200° C. under a pressure of 26 to 40 kgf, and the thus formed surface layer having a thickness of 1 mm was cut to prepare a tile-like floor material having a size of 450×450 mm.

In order to judge dry maintenance performance of the thus prepared floor material, the surface of the floor material was polished for 15, 20 or 30 seconds using a high speed buffing machine (Clean Star D-430, manufactured by Amano), and color change, gloss, abrasion and blister on the surface layer were examined. The results are shown in Table 1.

Also, color change, gloss, abrasion and blister on the surface layer were examined after one, two or three times of the 20 second polishing using the high speed buffing machine. The results are shown in Table 2.

In this case, the gloss was measured in accordance with the procedure of JIS K 7105 (gloss measurement) and the color change, abrasion and blister were observed by the naked eye.

Also, in order to examine flaw resistance of the floor material, a flaw resistance test was carried out in which a scratch was made by applying a load of 2.5 kgf for a first time, 5.0 kgf for a second time or 10 kgf for a third time making use of an edge of a stainless steel plate having a thickness of 0.5 mm and depth of the scratch was measured, and a stain resistance test was also carried out in accordance with the procedure of JIS L 1023. The results are shown in Table 3.

EXAMPLE 2

A tile-like floor material was prepared in the same manner as described in Example 1, except that a low molecular weight polyethylene (Mitsui High Wax, manufactured by Mitsui Petrochemical Industries) was used as the wax, and high speed buffing machine polishing test, flaw resistant test and stain resistance test were carried out in the same manner as described in Example 1. The results are shown in Tables 1, 2 and 3.

EXAMPLE 3

A tile-like floor material was prepared in the same manner as described in Example 1, except that a petroleum resin (Highlets, manufactured by Mitsui Petrochemical Industries) was used as the wax, and high speed buffing machine polishing test, flaw resistant test and stain resistance test were carried out in the same manner as described in Example 1. The results are shown in Tables 1, 2 and 3.

EXAMPLE 4

A mixture of 14% by weight of a high density polyethylene (melt index: 7), 14% by weight of an ethylene-vinyl acetate copolymer (vinyl acetate content: 15% by weight; melt index: 7), 68.2% by weight of calcium carbonate powder (average particle size: 3 μm), 3.5% by weight of the low molecular weight polyethylene used in Example 2 as a wax and 0.3% by weight of a heat stabilizer and a light stabilizer was subjected to an extrusion granulating machine to obtain powdery granules (average particle size: about 0.5 mm) for producing the surface layer.

Thereafter, a tile-like floor material was prepared in the same manner as described in Example 1, except that the thus obtained powdery granules were used in stead of the powdery granules of Example 1, and high speed buffing machine polishing test, flaw resistant test and stain resistance test were carried out in the same manner as described in Example 1. The results are shown in Tables 1, 2 and 3.

COMPARATIVE EXAMPLE 1

For the sake of comparison, powdery granules for producing surface layer containing no wax (blending ratio of polypropylene, ethylene-vinyl acetate copolymer, calcium carbonate and additive agents are as described in Example 1) were prepared, and a tile-like floor material in the same manner as described in Example 1 was prepared, except that the thus prepared wax-free powdery granules were used in stead of the powdery granules of Example 1.

Thereafter, color change, gloss, abrasion and blister on the surface layer after polishing with a high speed buffing machine were examined in the same manner as described in Example 1, and flaw resistant test and stain resistance test were carried out in the same manner as described in Example 1. The results are shown in Tables 1, 2 and 3.

COMPARATIVE EXAMPLE 2

A tile-like floor material was prepared in the same manner as described in Example 1, except that 28% by weight of a vinyl chloride resin was used in stead of polypropylene and ethylene-vinyl acetate copolymer and wax-free powdery granules were used, and high speed buffing machine polishing test, flaw resistant test and stain resistance test were carried out in the same manner as described in Example 1. The results are shown in Tables 1, 2 and 3.

COMPARATIVE EXAMPLE 3

A tile-like floor material was prepared in the same manner as described in Example 1, except that 0.5% by weight of the low molecular weight polyethylene used in Example 2 was used as the wax, and high speed buffing machine polishing test, flaw resistant test and stain resistance test were carried out in the same manner as described in Example 1. The results are shown in Tables 1, 2 and 3.

COMPARATIVE EXAMPLE 4

A tile-like floor material was prepared in the same manner as described in Example 1, except that 12% by weight of the low molecular weight polyethylene used in Example 2 was used as the wax, and high speed buffing machine polishing test, flaw resistant test and stain resistance test were carried out in the same manner as described in Example 1. The results are shown in Tables 1, 2 and 3.

COMPARATIVE EXAMPLE 5

Powdery granules having the same composition of Example 4 except that no wax was mixed were prepared, and a tile-like floor material was produced in the same manner as described in Example 4. Thereafter, high speed buffing machine polishing test, flaw resistant test and stain resistance test of the thus produced floor material were carried out in the same manner as described in Example 1. The results are shown in Tables 1, 2 and 3.

TABLE 1

| | Number of polishing times with a buffing machine | | | | | | | | | | | |
|---|---|---|---|---|---|---|---|---|---|---|---|---|
| | 15 seconds | | | | 20 seconds | | | | 30 seconds | | | |
| | Color Change | Gloss (%) | Abrasion | Blister | Color Change | Gloss (%) | Abrasion | Blister | Color Change | Gloss (%) | Abrasion | Blister |
| Example 1 | None | +5.1 | Not Obvious | None | None | +21.4 | Not Obvious | None | None | +71.1 | Not Obvious | None |
| Example 2 | " | +28.8 | " | " | " | +40.1 | " | " | " | +64.9 | " | " |
| Example 3 | " | +3.7 | " | " | " | +17.2 | " | " | " | +43.9 | " | " |
| Example 4 | " | +25.3 | " | " | " | +36.7 | " | " | " | +65.0 | " | " |
| Comparative Example 1 | " | +1.7 | " | " | " | +4.6 | " | " | " | +11.3 | Small | " |
| Comparative Example 2 | " | −14.5 | " | " | Medium | −47.1 | Small | Small | Large | −63.7 | Medium | Medium |
| Comparative Example 3 | " | +2.1 | " | " | None | +10.7 | Not Obvious | None | None | +21.9 | Not Obvious | None |
| Comparative Example 4 | " | +34.8 | " | " | " | +43.1 | " | " | " | +60.0 | " | " |
| Comparative Example 5 | " | +1.5 | " | " | " | +3.8 | " | " | " | +10.0 | " | " |

TABLE 2

| | Number of polishing times with a buffing machine | | | | | | | | | | | |
|---|---|---|---|---|---|---|---|---|---|---|---|---|
| | 15 seconds | | | | 20 seconds | | | | 30 seconds | | | |
| | Color Change | Gloss (%) | Abrasion | Blister | Color Change | Gloss (%) | Abrasion | Blister | Color Change | Gloss (%) | Abrasion | Blister |
| Example 1 | None | +17.7 | Not Obvious | None | None | +30.4 | Not Obvious | None | None | +44.1 | Not Obvious | None |
| Example 2 | " | +22.8 | " | " | " | +38.6 | " | " | " | +49.1 | " | " |
| Example 3 | " | +12.4 | " | " | " | +21.7 | " | " | " | +32.4 | " | " |
| Example 4 | " | +21.5 | " | " | " | +35.5 | " | " | " | +45.8 | " | " |
| Comparative Example 1 | " | +2.9 | " | " | " | +9.9 | " | " | " | +19.1 | Small | " |
| Comparative Example 2 | Medium | −44.5 | Small | " | Large | −51.3 | Medium | " | Large | −77.8 | Large | Large |
| Comparative Example 3 | None | +5.8 | None | " | None | +13.6 | Not Obvious | None | None | +25.7 | Not Obvious | None |
| Comparative Example 4 | " | +25.2 | " | " | " | +39.0 | " | " | " | +55.1 | " | " |
| Comparative Example 5 | " | +2.0 | " | " | " | +6.0 | " | " | " | +13.5 | " | " |

TABLE 3

|  | Flaw resistance test | | | Stain resistance test |
| --- | --- | --- | --- | --- |
|  | First (mm) | Second (mm) | Third (mm) |  |
| Example 1 | 0.07 | 0.14 | 0.29 | ○ |
| Example 2 | 0.05 | 0.09 | 0.22 | ○ |
| Example 3 | 0.08 | 0.17 | 0.32 | ○ |
| Example 4 | 0.06 | 0.12 | 0.25 | ○ |
| Comparative Example 1 | 0.08 | 0.17 | 0.35 | Δ |
| Comparative Example 2 | 0.05 | 0.12 | 0.30 | ○ |
| Comparative Example 3 | 0.08 | 0.16 | 0.31 | ○ |
| Comparative Example 4 | 0.09 | 0.17 | 0.30 | Δ |
| Comparative Example 5 | 0.07 | 0.19 | 0.35 | Δ |

Note:
○ indicates good and
Δ indicates slightly good

As is evident from the results shown in Tables 1 and 2, the gloss of surface layers of the floor materials of the present invention having 1 to 10% by weight of was as in Examples 1 to 4 is markedly improved as the polishing period by a high speed buffing machine is prolonged and as the number of polishing times is increased. In addition, the floor materials of Examples 1 to 4 cause no changes in color, generate no obvious abrasion and form no blisters, thus showing the markedly excellent dry maintenance performance by a high speed buffing machine.

On the contrary, in the case of the floor materials of Comparative Examples 1 and 5 in which wax is not included in their surface layers and of Comparative Examples 3 in which its wax content is less than 1% by weight, the gloss of their surface layers is markedly improved as the polishing period by a high speed buffing machine is prolonged and as the number of polishing times is increased, but the gloss-increasing ratio is extremely low in comparison with the floor materials of Examples 1 to 4, hence showing their inferior dry maintenance performance to that of the floor materials of Examples 1 to 4. On the other hand, it is evident that the vinyl chloride resin floor material of Comparative Example 2 is not suited for dry maintenance, because its surface gloss is considerably reduced and its color change, abrasion, blister and the like become great as the polishing period by a high speed buffing machine is prolonged and as the number of polishing times is increased.

Also, it is evident from the results shown in Table 3 that the depth of scratch on the floor materials of Examples 1 to 4 after the flaw resistance test is small and the results of their stain resistance test are also excellent, in comparison with the floor materials of Comparative Examples 1 and 5 in which wax is not used and of Comparative Examples 3 in which its wax content is less than 1% by weight, and that the inventive floor materials have almost the same flaw resistance and stain resistance as those of the vinyl chloride resin floor material of Comparative Example 2. In addition, the floor material of Comparative Example 4 in which 10% by weight or more of wax is contained in its surface layer shows markedly increased surface gloss as shown in Tables 1 and 2, but its stain resistance is reduced as shown in Table 3.

EXAMPLES 5 TO 12

Using an extruder, sheets having a thickness of 2 mm (sheets to be used as back side layers) having respective compositions shown as Examples 5 to 12 in Table 4 were prepared. Thereafter, the powdery granules for producing surface layer prepared in Example 1 were laminated on each of the thus obtained sheets and heated for 1 to 10 minutes at 130 to 200° C. under a pressure of 20 to 40 kgf, and the thus formed surface layer having a thickness of 1 mm was cut to prepare a tile-like floor material having a size of 450×450 mm.

Adhesiveness of each of the thus obtained floor materials of Examples 5 to 12 was examined by carrying out an adhesiveness test in accordance with the test method of JIS K 6854. The results are shown in Table 4.

In Table 4, the term "EVA (VA: 60% by weight)" means an ethylene-vinyl acetate copolymer containing 60% by weight of vinyl acetate, the term "EVA (VA: 20% by weight)" means an ethylene-vinyl acetate copolymer containing 20% by weight of vinyl acetate, the term "polypropylene" means a polypropylene having a melt index of 10 and the term "additive agent" means a heat stabilizer.

Also in Table 4, results of the evaluation of adhesiveness were judged by "very good" meaning that the sample showed the necessary strength as a floor material for almost all commercially available adhesive agents for floor use; "good" meaning that the sample does not show necessary strength as a floor material for a quite few commercially available adhesive agents for floor use, "slightly good" meaning that the sample does not show necessary strength as a floor material for several commercially available adhesive agents for floor use, "slightly bad" meaning that the sample showed the necessary strength as a floor material for only a few commercially available adhesive agents for floor use, and "bad" meaning that the sample does not show necessary strength as a floor material for almost all commercially available adhesive agents for floor use.

COMPARATIVE EXAMPLES 6 TO 8

For the sake of comparison, sheets having a thickness of 2 mm which has respective compositions shown as Comparative Examples 6 to 8 in Table 4 were prepared using an extruder. Thereafter, the powdery granules for producing surface layer prepared in Example 1 were laminated on each of the thus obtained sheets and heated under a pressure, and the thus formed surface layer having a thickness of 1 mm was cut to prepare a tile-like floor material having a size of 450×450 mm.

Adhesiveness test of each of the thus obtained floor materials of Comparative Examples 6 to 8 was carried out in the same manner as described in Examples 5 to 12. The results are shown in Table 4.

TABLE 4

| | Back side layer composition (% by weight) | | | | | | |
|---|---|---|---|---|---|---|---|
| | EVA (VA: 60% by weight) | EVA (VA: 20% by weight) | Poly-propylene | CaCO₃ powder (Size: 3 μm) | Rosin | Additive agent | Evaluation of adhesiveness |
| Example 5 | 28 | — | — | 67 | 4.8 | 0.2 | Very Good |
| Example 6 | 12 | — | 16 | 67 | 4.8 | 0.2 | Very Good |
| Example 7 | 25 | — | 30 | 40 | 4.8 | 0.2 | Good |
| Example 8 | 3 | — | 4 | 90 | 4.8 | 0.2 | Good |
| Example 9 | 6 | — | 22 | 67 | 4.8 | 0.2 | Good |
| Example 10 | — | 12 | 16 | 67 | 4.8 | 0.2 | Slightly Good |
| Example 11 | 28 | — | — | 69 | 2.8 | 0.2 | Very Good |
| Example 12 | 12 | — | 16 | 69 | 2.8 | 0.2 | Very Good |
| Comparative Example 6 | 14 | — | 15 | 70.8 | — | 0.2 | Bad |
| Comparative Example 7 | 7 | — | 10 | 67.8 | 15 | 0.2 | Very Good |
| Comparative Example 8 | — | — | 25 | 70 | 4.8 | 0.2 | Slightly Bad |

As shown in Table 4, excellent adhesiveness judged as "very good" or "good" by the adhesiveness test was found in all of the floor materials of Examples 5 to 12 in which an ethylene-vinyl acetate copolymer or a mixed resin of such a copolymer and polypropylene was used as the back side layer resin and an inorganic filler (calcium carbonate powder) and 1 to 10% by weight of rosin were included therein. On the contrary, the rosin-free floor material of Comparative Example 6 was judges as "bad", thus showing a great contribution of rosin to the improvement of adhesiveness.

Also, the result of the evaluation of the floor material of Comparative Example 8 in which an ethylene-vinyl acetate copolymer was not used but polypropylene was used solely as the resin of its back side layer was "slightly bad" even in the presence of rosin within the range of from 1 to 10% by weight. It is evident from this result that an ethylene-vinyl acetate copolymer must be included in the back side layer in order to provide excellent adhesiveness.

In this connection, though an evaluation result of "very good" was found in the floor material of Comparative Example 7 in which rosin was used in a large amount of 15% by weight, this material could not be used preferably, because the strength of its back side layer necessary for practical use was reduced and its appearance became poor due to unstable hue caused by the coloring of rosin, though it would not cause serious problem in practice.

Next, when the floor materials of Examples 5, 6, 11 and 12 are compared with the floor materials of Examples 7 and 8, the floor materials of Examples 5, 6, 11 and 12 which contain calcium carbonate powder within the range of from 50 to 85% by weight were judged as "very good", while the judgement is "good" in the floor material of Example 7 having a small calcium carbonate powder content of 40% by weight and in the floor material of Example 8 having a large calcium carbonate powder content of 90% by weight. It is evident from this result that more excellent adhesiveness can be obtained when the content of inorganic fillers such as calcium carbonate is set within the aforementioned range.

A mixed resin of an ethylene-vinyl acetate copolymer and polypropylene was used as the back side layer resin in each of the floor materials of Examples 6 and 12 and the floor material of Example 9, and the floor materials of Examples 6 and 11 in which the ethylene-vinyl acetate copolymer was used at a large mixing ratio of 30% or more were judges as "very good" while the floor material of Example 9 in which the ethylene-vinyl acetate copolymer was used at a small mixing ratio of about 20% was judged as "good". It is evident from this result that, when a mixed resin of an ethylene-vinyl acetate copolymer and polypropylene is used as the back side layer resin, a copolymer mixing ratio of 30% or more is advantageous in improving adhesiveness.

In addition, when the floor materials of Examples 6 and 12 are compared with the floor material of Example 10, the evaluation result was "very good" in the floor materials of Examples 6 and 12 in which a mixed resin of polypropylene and an ethylene-vinyl acetate copolymer containing 35% by weight or more vinyl acetate was used, while the evaluation result was "slightly good" in the floor material of Example 10 in which a mixed resin of polypropylene and an ethylene-vinyl acetate copolymer containing 20% by weight or more vinyl acetate was used. The evaluation result was also "very good" in the floor materials of Examples 5 and 11 in which an ethylene-vinyl acetate copolymer containing 35% by weight or more vinyl acetate is singly used. These results show that the adhesiveness can be markedly improved by the use of an ethylene-vinyl acetate copolymer containing 35% by weight or more vinyl acetate, alone or as a mixture with other olefinic resin.

INDUSTRIAL APPLICABILITY

According to the floor material of the present invention, an olefinic resin is used as the base material, an inorganic filler is blended therewith and a wax in an amount of 1 to 10% by weight is contained at least in the surface layer, so that it generates no harmful gas such as hydrogen chloride at the time of a fire, is suitable for dry maintenance with a high speed buffing machine and has excellent resistances against flaws, stains, abrasion and the like. In addition, adhesion of the floor material of the present invention to the floor ground can be improved greatly, because a back side layer in which an ethylene-vinyl acetate copolymer or a mixed resin of such a copolymer and other olefinic resin is used as its base material and an inorganic filler is blended therewith is laminated on the under side of its surface layer and 1 to 10% by weight of rosin is included in the back side layer.

The floor material of the present invention can be used broadly as the flooring in, for example, constructions such as buildings, apartment houses and the like, and transportation means such as cars, ships, aircraft and the like.

We claim:

1. A floor material comprising at least two layers, wherein one of the layers is a surface layer, wherein said at least two layers comprise an olefinic resin as the base material and an inorganic filler blended therein, wherein a wax in an amount of from 1 to 10% by weight is contained in said surface layer.

2. The floor material according to claim 1, wherein the surface layer contains 1 to 7% by weight of a wax.

3. The floor material according to claim 1 or 2, wherein the wax contained in the surface layer is at least one member selected from a low molecular weight polyethylene, an alicyclic saturated hydrocarbon resin and a petroleum resin.

4. The floor material according to claim 1 or 2, wherein a back side layer which comprises an ethylene-vinyl acetate copolymer or a mixed resin of said copolymer and other olefinic resin as the base material and an inorganic filler blended therein is laminated on the under side of the surface layer, and 1 to 10% by weight of rosin is included in said back side layer.

5. The floor material according to claim 4, wherein said back side layer contains 50 to 85% by weight of an inorganic filler.

6. The floor material according to claim 4, wherein said ethylene-vinyl acetate copolymer included as a base material in the back side layer contains 35 to 75% by weight of vinyl acetate.

7. The floor material according to claim 5 or 6, which further comprises an olefinic resin intermediate layer between said surface layer and back side layer.

8. The floor material according to claim 1, wherein one of the layers is a back side layer and wherein the surface layer is free of rosin, the back side layer is free of wax and the back side layer comprises rosin.

9. The floor material according to claim 8 comprising an intermediate layer, wherein the intermediate layer is free of both rosin and wax.

10. The floor material according to claim 3, wherein a backside layer which comprises an ethylene-vinyl acetate copolymer or a mixed resin of said copolymer and other olefinic resin as the base material and an inorganic filler blended therein is laminated on the under side of the surface layer, and 1 to 10% by weight of rosin is included in said back side layer.

11. The floor material according to claim 5, wherein said ethylene-vinyl acetate copolymer included as a base material in the back side layer contains 35 to 75% by weight of vinyl acetate.

12. The floor material according to claim 4, which further comprises an olefinic resin intermediate layer between said surface layer and said back side layer.

* * * * *